(12) United States Patent
Jang et al.

(10) Patent No.: US 9,419,493 B2
(45) Date of Patent: Aug. 16, 2016

(54) BEARING SEAL FOR FAN MOTOR

(71) Applicant: NEW MOTECH CO., LTD., Gwangju (KR)

(72) Inventors: Jeong Cheol Jang, Gwangju (KR); Gyeong Su Park, Gwangju (KR); Woo Sung Cho, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 110 days.

(21) Appl. No.: 14/506,683

(22) Filed: Oct. 5, 2014

(65) Prior Publication Data

US 2015/0167688 A1    Jun. 18, 2015

(30) Foreign Application Priority Data

Dec. 13, 2013  (KR) .......................... 10-2013-0161663

(51) Int. Cl.
| | | |
|---|---|---|
| *H02K 5/04* | (2006.01) | |
| *H02K 5/16* | (2006.01) | |
| *H02K 5/173* | (2006.01) | |
| *H02K 5/167* | (2006.01) | |
| *F04D 29/063* | (2006.01) | |
| *F04D 29/62* | (2006.01) | |
| *F04D 29/64* | (2006.01) | |
| *H02K 7/14* | (2006.01) | |

(52) U.S. Cl.
CPC .. *H02K 5/04* (2013.01); *H02K 5/16* (2013.01); *H02K 5/167* (2013.01); *H02K 5/1672* (2013.01); *H02K 5/173* (2013.01); *F04D 29/063* (2013.01); *F04D 29/626* (2013.01); *F04D 29/646* (2013.01); *H02K 7/14* (2013.01)

(58) Field of Classification Search
CPC ............ H02K 5/15; H02K 5/04; H02K 5/16; H02K 5/167; H02K 5/173; H02K 5/1672; H02K 5/1677; H02K 7/08; H02K 7/14; F16C 17/08; F16C 17/00; F04D 29/063; F04D 29/08; F04D 29/626; F04D 29/646
USPC ........................................ 384/489; 310/89, 90
See application file for complete search history.

(56) References Cited

U.S. PATENT DOCUMENTS 6,012,849 A * 1/2000 Takagi ................... F16C 23/045
                                                          384/192
6,577,031 B2   6/2003 Morooka et al.
(Continued)

FOREIGN PATENT DOCUMENTS

| JP | 36-006606 U | 4/1961 |
|---|---|---|
| JP | 57-159357 U | 10/1982 |
| JP | 59-132359 U | 9/1984 |
| JP | 10-339323 A | 12/1998 |
| KR | 20-1990-0009202 U | 5/1990 |

(Continued)

*Primary Examiner* — Terrance Kenerly
*Assistant Examiner* — Alexander Singh
(74) *Attorney, Agent, or Firm* — Revolution IP, PLLC

(57) ABSTRACT

Disclosed is a fan motor includes: a first bracket having a middle part through which a rotary shaft penetrates and an upper bearing insertion space to which an upper bearing is inserted to support the upper end part of the rotary shaft; an upper felt cover joined to the inside of the first bracket to seal the upper bearing insertion space; a second bracket joined to the upper side of the first bracket, the second bracket having a lower bearing insertion space which is formed at the middle part of the lower side through which the rotary shaft penetrates and to which a lower bearing is inserted to support the lower end part of the rotary shaft; and a lower felt cover joined to the lower side of the second bracket to seal the lower bearing insertion space.

5 Claims, 4 Drawing Sheets

(56) References Cited

U.S. PATENT DOCUMENTS

2007/0138748 A1\* 6/2007 Orlowski ............. F16J 15/4478
    277/412
2012/0326538 A1\* 12/2012 Yoshida .................... H02K 5/08
    310/43
2013/0229073 A1\* 9/2013 Momin .................... H02K 5/10
    310/71

FOREIGN PATENT DOCUMENTS

| KR | 20-1999-0031552 | 7/1999 |
|----|-----------------|--------|
| KR | 20-0269665 Y1 | 3/2002 |
| KR | 10-0511324 B1 | 8/2005 |
| KR | 10-2009-0087720 A | 8/2009 |
| KR | 10-2010-0029618 A | 3/2010 |
| KR | 10-1074935 B1 | 10/2011 |
| KR | 10-2012-0002879 A | 1/2012 |

\* cited by examiner

BEARING SEAL FOR FAN MOTOR

CROSS REFERENCE TO PRIOR APPLICATIONS

This application claims priority under 35 U.S.C. §119 to Korean Patent Application No. KR 10-2013-0161663 filed on Dec. 23, 2013, which is hereby incorporated by reference in its entirety.

BACKGROUND OF THE INVENTION

1. Field of the Invention

The present invention relates to a fan motor, and more particularly, to a fan motor which can reduce processing time because an assembling process is simple and effectively prevent oil leakage from a motor housing.

2. Background Art

In general, a motor used to blow cold air of a refrigerator or circulate inside air and outside air of a device is called a fan motor. Such a fan motor is generally installed in a humid place or in the environment where dew condensation is caused due to a change in temperature. Therefore, because permeation of moisture to the inside of the motor may cause malfunction of the motor, various structures of the motor for preventing such a problem have been studied.

Korean Patent Nos. 10-0511324 and 10-1074935 and U.S. Pat. No. 6,577,031 disclose technologies to manufacture a motor housing by resin insert molding together with a stator and a printed circuit board of the motor. According to the prior arts, because the motor housing is manufactured by resin molding in such a way that the stator and the printed circuit board are embedded therein, it has an effective structure which prevents permeation of moisture to the inside of the motor.

However, such a motor structure has several disadvantages in that it is difficult to assemble upper and lower felt covers serving to seal a space to which oil is supplied to smoothly rotate a bearing and in that oil leaks out of the motor housing in a case of misassembly.

Therefore, the inventors of the present invention propose a fan motor structure which is simple in assembly through improvement of the motor housing structure and can minimize oil leakage.

SUMMARY OF THE INVENTION

Accordingly, the present invention has been made to solve the above-mentioned problems occurring in the prior arts, and it is an object of the present invention to provide a fan motor with a new structure.

It is another object of the present invention to provide a fan motor which simplifies assembly of upper and lower felt covers so as to reduce processing time required to manufacture a motor housing.

It is a further object of the present invention to provide a fan motor which includes an oil ring additionally mounted to minimize oil leakage.

The above and other objects, features and advantages of the present invention will be achieved by the following detailed description of the preferred embodiment of the invention.

To accomplish the above object, according to the present invention, there is provided a fan motor including: a first bracket having a middle part through which a rotary shaft penetrates and an upper bearing insertion space to which an upper bearing is inserted to support the upper end part of the rotary shaft; an upper felt cover joined to the inside of the first bracket to seal the upper bearing insertion space; a second bracket joined to the upper side of the first bracket, the second bracket having a lower bearing insertion space which is formed at the middle part of the lower side through which the rotary shaft penetrates and to which a lower bearing is inserted to support the lower end part of the rotary shaft; and a lower felt cover joined to the lower side of the second bracket to seal the lower bearing insertion space.

Here, a flange part which has a plurality of first joining protrusions protruding toward the inside extends downwardly from the upper end part of the inner face of the first bracket, and a first joining groove to which the first joining protrusions formed on the flange part are inserted is formed on the outer surface of the upper felt cover.

Moreover, a plurality of second joining protrusions protrude from the inner face of the lower part of the second bracket toward the inside, and a second joining groove to which the second joining protrusions are inserted is formed on the outer surface of the lower felt cover.

Furthermore, an upper oil ring is mounted on the upper side of the upper felt cover to prevent oil leakage between the upper felt cover and the first bracket.

Additionally, a first seating recess to which the upper oil ring is inserted and fixed is formed on the upper side of the upper felt cover in a circle.

Moreover, a lower oil ring is mounted on the upper side of the lower felt cover to prevent oil leakage between the lower felt cover and the second bracket.

In addition, a second seating recess to which the lower oil ring is inserted and fixed is formed on the upper side of the lower felt cover in a circle.

The fan motor according to the preferred embodiment of the present invention provides a structure that the upper and lower felt covers are easily joined to the first and second brackets so as to reduce processing time by simplifying assembling work of the motor housing.

Additionally, the fan motor according to the preferred embodiment of the present invention includes the oil ring additionally mounted on the upper and lower felt covers in order to minimize oil from leaking to the outside.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
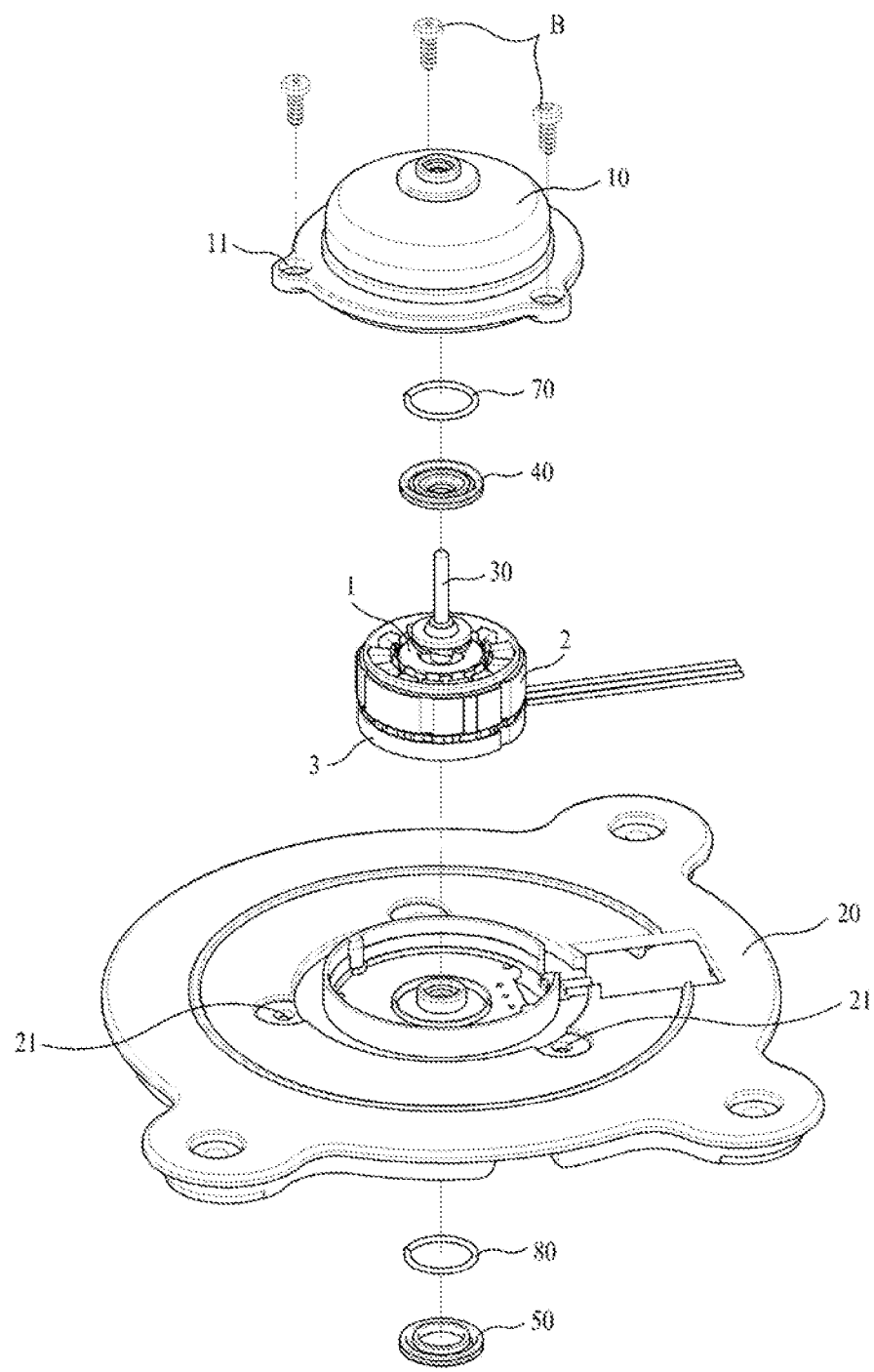
FIG. 1 is an exploded perspective view of a fan motor according to a preferred embodiment of the present invention.

Reference will be now made in detail to the preferred embodiments of the present invention with reference to the attached drawings. In the drawings, the same components have the same reference numerals and the same names, and additional descriptions of the components will be omitted in the following.

Figure 2:
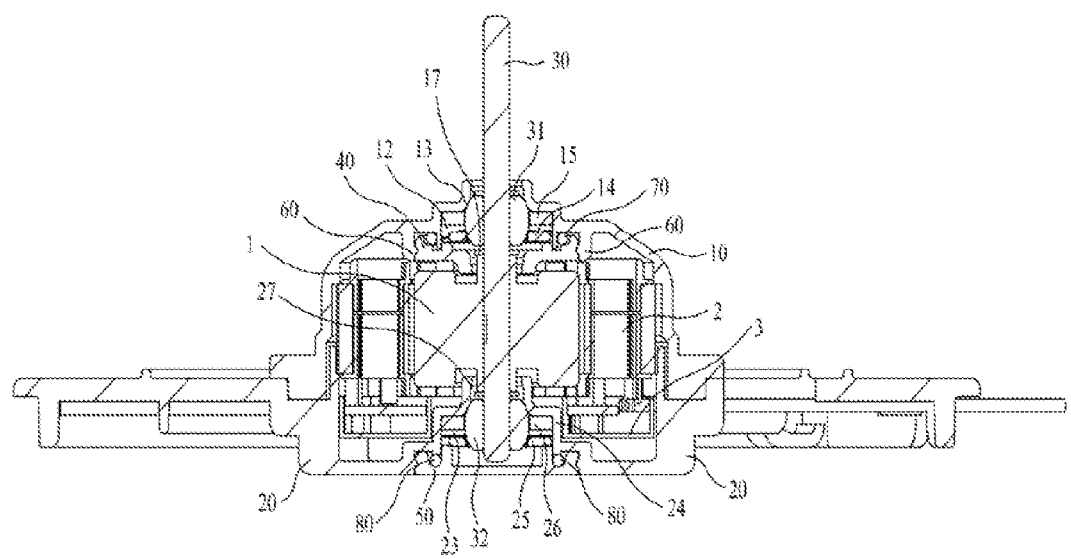
FIG. 2 is a sectional view of a cut part of the fan motor.

FIG. 1 is an exploded perspective view of a fan motor according to a preferred embodiment of the present invention, and FIG. 2 is a sectional view of a cut part of the fan motor.

As shown in FIGS. 1 and 2, the fan motor according to the preferred embodiment of the present invention includes a first bracket 10, a second bracket 20, a rotary shaft 30, an upper felt cover 40, and a lower felt cover 50.

The first bracket 10 and the second bracket 20 are manufactured by plastic injection molding and are screw-coupled with each other by bolts (B). For this, screw holes 11 and 21 to which the bolts (B) are inserted are respectively formed in the outer circumferential surface of the first bracket 10 and the upper side of the second bracket 20.

Of course, the joining structure of the first and second brackets 10 and 20 may be changed in various ways, for instance, the first and second brackets 10 and 20 respectively have fusion holes (not shown) and fusion protrusions (not shown), and the first bracket 10 is joined to the second bracket 20 in such a manner that ultrasonic waves are applied to the fusion protrusions so as to be fused and adhered to the fusion holes.

The first bracket 10 and the second bracket 20 are joined to each other as described above, and a rotor 1, a stator 2, a printed circuit board 3 and the rotary shaft are located inside the joined brackets 10 and 20. The rotor 1, the stator 2 and the printed circuit board 3 are general devices for the fan motor, and hence, their detailed descriptions will be omitted.

The rotary shaft 30 penetrates the middle parts of the first bracket 10 and the second bracket 20. As shown in FIG. 2, the rotary shaft 30 has an upper end part which is supported to be rotated by an upper bearing 31 located inside the middle part of the first bracket 10 and a lower end part which is supported to be rotated by a lower bearing 32.

Here, the upper bearing 31 is inserted into an upper bearing insertion space 12 of the first bracket 10 and is forcedly pressed and fixed into an upper bearing pressing part 13 which is formed inside the middle part of the first bracket 10. The lower part of the upper bearing 31 is supported by an upper board push 14.

Moreover, an upper felt 15 is located on the outer circumferential surface of the upper bearing 31, and the upper felt 15 supplies oil for a smooth rotation of the upper bearing 31 to the upper bearing insertion space 12.

The upper felt cover 40 is joined to the inside of the first bracket 10 and serves to seal the upper bearing insertion space 12.

Figure 3:
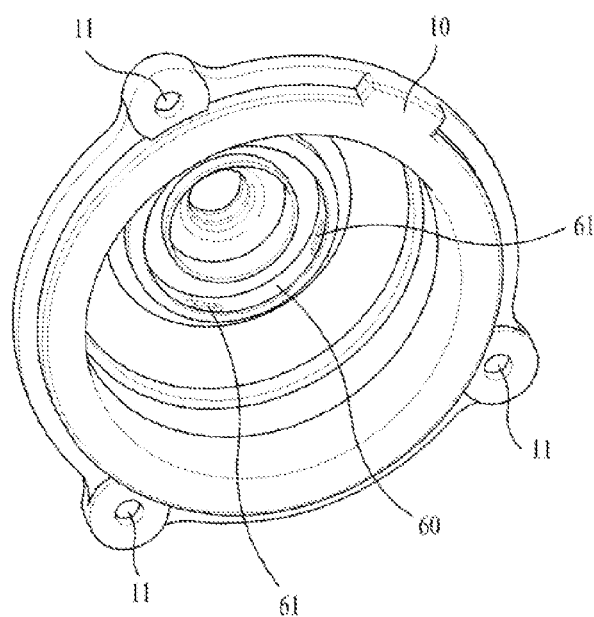
FIG. 3 is a perspective view showing an inside structure of a first bracket of the fan motor in more detail.
Figure 4:
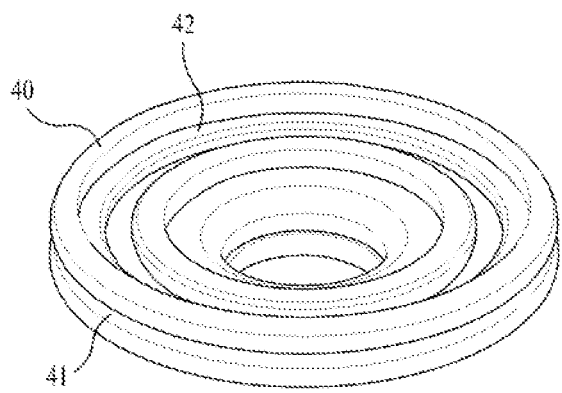
FIG. 4 is a perspective view showing a structure of an upper felt cover of the fan motor in more detail.

FIG. 3 is a perspective view showing an inside structure of a first bracket of the fan motor in more detail, and FIG. 4 is a perspective view showing a structure of an upper felt cover of the fan motor in more detail.

As shown in FIG. 3, a flange part 60, which has a plurality of first joining protrusions 61 protruding toward the inside, extends downwardly from the upper end part of the inner face of the first bracket 10, and as shown in FIG. 4, a first joining groove 41 to which the first joining protrusions 61 formed on the flange part 60 are inserted is formed in a circle along the circumferential surface.

Therefore, when the upper felt cover 40 is pushed into the flange part 60, the first joining protrusions 61 formed on the inner face of the flange part 60 are naturally inserted into the first joining groove 41 formed on the outer surface of the upper felt cover 40, and hence, the upper felt cover 40 is joined to the flange part 60, thereby sealing the upper bearing insertion space 12.

Here, positions of the first joining protrusions 61 and the first joining groove 41 may be varied. That is, if necessary, the joining groove may be formed in the inner face of the flange part 60, and the joining protrusions may be formed on the outer face of the upper felt cover 40.

Such a joining structure of the upper felt cover 40 and the first bracket 10 simplifies assembling work of the fan motor to reduce processing time because the upper felt cover 40 can be easily joined to the first bracket 10.

However, as described above, because the rotary shaft 30 passes the middle part of the upper felt cover 40 in a state where the upper felt cover 40 is joined to the flange part 60, there is a risk that oil leaks between the rotary shaft 30 and the upper felt cover 40. Therefore, an upper oil return washer insertion part 16 is formed inside the middle part of the upper felt cover 40, and an upper oil return washer 17 is inserted into the upper oil return washer insertion part 16 in order to prevent oil leakage between the rotary shaft 30 and the upper felt cover 40.

In the meantime, it is preferable that an upper oil ring 70 be mounted on the upper side of the upper felt cover 40 to prevent oil leakage between upper felt cover 40 and the first bracket 10. For this, as shown in FIG. 4, on the upper side of the upper felt cover 40, a first seating recess 42 to which the upper oil ring 70 is inserted and fixed is formed in a circle.

As described above, in the state where the upper oil ring 70 is mounted on the upper side of the upper felt cover 40, when the upper felt cover 40 is joined to the inside of the first bracket 10, the upper oil ring 70 which is in a forcedly pressed state is naturally located between the inner face of the upper end part of the first bracket 10 and the upper felt cover 40, so as to prevent oil leakage between the upper felt cover 40 and the inner face of the upper end part of the first bracket 10. Of course, the upper oil ring 70 may be first joined to the inside of the first bracket 10, and then, the upper felt cover 40 is joined.

The lower bearing 32 is located in a lower bearing insertion space 23 formed at the middle part of the lower side of the second bracket 20, and the upper part of the lower bearing 32 is pressed and fixed to a lower bearing pressing part formed at the upper part of the middle part of the lower bearing insertion space 23. The lower part of the lower bearing 32 is supported by a lower board push 25.

Furthermore, a lower felt 26 for supplying oil to smoothly rotate the lower bearing 32 is mounted on the outer circumferential surface of the lower bearing 32, and a lower oil return washer insertion part 27 is formed at the upper part of the lower bearing pressing part 24. A lower oil return washer 28 is inserted into the lower oil return washer insertion part 27 in order to prevent oil from leaking toward the upper part of the lower bearing 32.

The lower felt cover 50 is joined to the lower side of the second bracket 20 and serves to seal the lower bearing insertion space 23.

Figure 5:
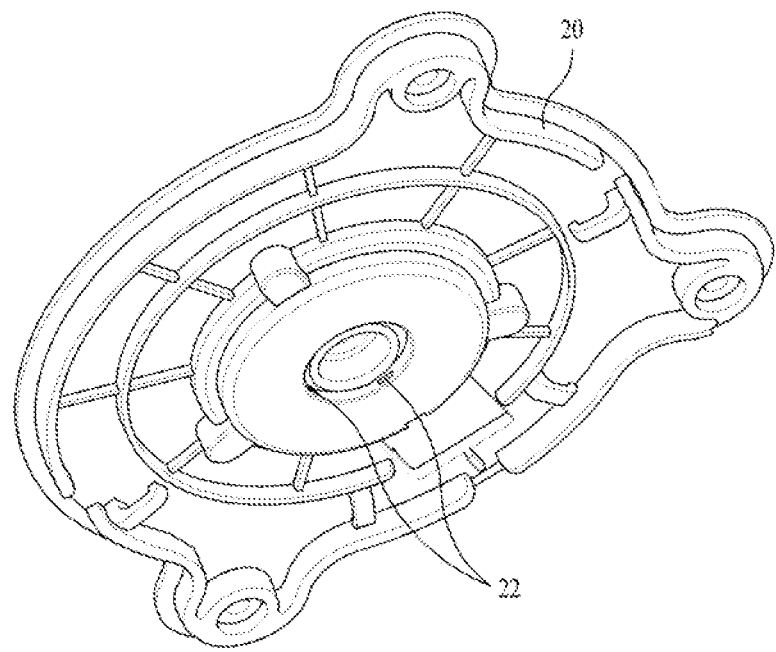
FIG. 5 is a perspective view showing a lower side structure of a second bracket of the fan motor in more detail.
Figure 6:
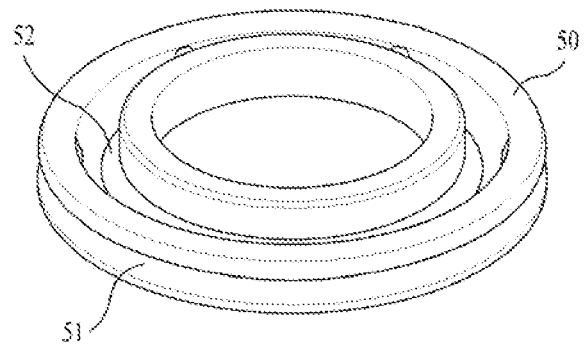
FIG. 6 is a perspective view showing a structure of a lower felt cover of the fan motor in more detail.

FIG. 5 is a perspective view showing a lower side structure of a second bracket of the fan motor in more detail, and FIG. 6 is a perspective view showing a structure of a lower felt cover of the fan motor in more detail.

For this, on the inner face of the lower part of the second bracket 20, a plurality of second joining protrusions 22 which is similar with the first joining protrusions 61 formed on the flange part 60 protrude toward the inside, and a second joining groove 51 to which the second joining protrusions 22 are inserted is formed in a circle along the circumferential surface of the outer face of the lower felt cover 50.

Therefore, when the lower felt cover 50 is pushed toward the inner face of the lower part of the second bracket 20, the second joining protrusions 22 formed on the inner face of the lower part of the second bracket 20 are naturally inserted into the second joining groove 51 formed on the outer face of the lower felt cover 50, and hence, the lower felt cover 50 is joined to the lower side of the second bracket 20, such that the lower bearing insertion space 23 is sealed by the lower felt cover 40.

Here, positions of the second joining protrusions 22 and the second joining groove 51 may be varied. That is, if necessary, the joining groove may be formed in the inner face of the lower part of the second bracket 20, and the joining protrusions may be formed on the outer face of the lower felt cover 50.

Like the joining structure of the upper felt cover 40 and the first bracket 10, such a joining structure of the lower felt cover 50 and the second bracket 20 simplifies assembling work of the fan motor to reduce processing time because the lower felt cover 50 can be easily joined to the second bracket 20.

Meanwhile, it is preferable that a lower oil ring 80 be mounted on the upper side of the lower felt cover 50 to prevent oil leakage between the lower felt cover 50 and the second bracket 20. For this, as shown in FIG. 6, a second seating recess 52 to which a lower oil ring 80 is inserted and fixed is formed in a circle in the upper side of the lower felt cover 50. Of course, the lower oil ring 80 may be first joined to the second bracket 20, and then, the lower felt cover 50 is joined.

As described above, after the lower oil ring 80 is mounted on the upper side of the lower felt cover 50, when the lower felt cover 50 is joined to the lower side of the second bracket 20, the lower oil ring 80 which is in a forcedly pressed state is naturally located between the lower side of the second bracket 20 and the lower felt cover 50 so as to keep sealability, such that it can be prevented that oil leaks between the lower felt cover 50 and the second bracket 20.

While the present invention has been described with reference to the particular illustrative embodiment, it is not to be restricted by the embodiment but only by the appended claims. It will be understood by those skilled in the art that changes or modifications without departing from the spirit and scope of the present invention belong to the scope of the present invention.

What is claimed is:

1. A fan motor comprising:
   a first bracket having a middle part through which a rotary shaft penetrates and an upper bearing insertion space to which an upper bearing is inserted to support the upper end part of the rotary shaft, a flange part which has a plurality of first joining protrusions protruding toward the inside extends downwardly from the upper end part of the inner face of the first bracket, and an upper felt disposed on an outer circumferential surface of the upper bearing;
   an upper felt cover sealing a lower part of the upper bearing insertion space by joining to the flange part, the upper felt cover having a first joining groove formed on the outer surface of the upper felt cover,
   wherein each first joining protrusion is inserted into the first joining groove;
   a second bracket joined to the upper side of the first bracket, the second bracket having a lower bearing insertion space which is formed at the middle part of the lower side through which the rotary shaft penetrates and to which a lower bearing is inserted to support the lower end part of the rotary shaft, a plurality of second joining protrusions protrude from the inner face of the lower part of the second bracket toward the inside, and a lower felt disposed on an outer circumferential surface of the lower bearing; and
   a lower felt cover sealing a lower part of the lower bearing insertion space, the lower felt cover having a second joining groove formed on the outer surface of the lower felt cover,
   wherein the lower felt over seals the lower bearing insertion space by inserting each second joining protrusion into the second joining groove.

2. The fan motor according to claim 1, wherein an upper oil ring is mounted on the upper side of the upper felt cover to prevent oil leakage between the upper felt cover and the first bracket.

3. The fan motor according to claim 2, wherein a first seating recess to which the upper oil ring is inserted and fixed is formed on the upper side of the upper felt cover in a circle.

4. The fan motor according to claim 1, wherein a lower oil ring is mounted on the upper side of the lower felt cover to prevent oil leakage between the lower felt cover and the second bracket.

5. The fan motor according to claim 4, wherein a second seating recess to which the lower oil ring is inserted and fixed is formed on the upper side of the lower felt cover in a circle.

* * * * *